United States Patent
Potter et al.

(10) Patent No.: US 11,619,360 B2
(45) Date of Patent: *Apr. 4, 2023

(54) HYBRID HEADLAMP SYSTEMS AND METHODS

(71) Applicant: Valeo North America, Inc., Troy, MI (US)

(72) Inventors: Brant Potter, Seymour, IN (US); John Orisich, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,834

(22) Filed: Dec. 10, 2020

(65) Prior Publication Data

US 2021/0156535 A1    May 27, 2021

Related U.S. Application Data

(60) Continuation of application No. 16/691,272, filed on Nov. 21, 2019, now Pat. No. 10,890,304, which is a
(Continued)

(51) Int. Cl.
*F21S 41/14* (2018.01)
*B60Q 1/14* (2006.01)
(Continued)

(52) U.S. Cl.
CPC ............ *F21S 41/14* (2018.01); *B60Q 1/1407* (2013.01); *F21S 41/141* (2018.01); *F21S 41/147* (2018.01);
(Continued)

(58) Field of Classification Search
CPC .......... B60Q 1/04; B60Q 1/14; B60Q 1/1407; B60Q 1/1415; B60Q 1/1423;
(Continued)

(56) References Cited

U.S. PATENT DOCUMENTS 9,108,568 B2    8/2015  Takahira et al.
9,175,824 B2   11/2015  Nakazato et al.
(Continued)

FOREIGN PATENT DOCUMENTS

CN    102853378 A    1/2013
CN    103562620 A    2/2014
(Continued)

OTHER PUBLICATIONS

Awadhesh K. Rai, et al., High Temperature Fiber Optic Laser-Enduced Breakdown Spectroscopy Sensor for Analysis of Molten Alloy Constituents, Review of Scientific Instruments, vol. 73, No. 10, Oct. 2002, pp. 3589-3599.
(Continued)

*Primary Examiner* — Jason M Han
(74) *Attorney, Agent, or Firm* — Valeo North America, Inc.

(57) ABSTRACT

A headlamp assembly includes a low beam assembly configured to generate a low beam distribution that includes a first low beam module having a first laser solid state light source that is optically configured to emit a first luminous intensity distribution and a second laser solid state light source that is optically configured to emit a second luminous intensity distribution, and a second low beam module having a solid state light source that is optically configured to emit a third luminous intensity distribution, which at least partially overlaps at least one of the first and second luminous intensity distributions; the headlamp assembly also having a high beam assembly configured to generate a high beam distribution.

12 Claims, 16 Drawing Sheets

Related U.S. Application Data division of application No. 15/608,357, filed on May 30, 2017, now Pat. No. 10,502,378.

(51) Int. Cl.

| | |
|---|---|
| *F21S 41/20* | (2018.01) |
| *F21S 41/141* | (2018.01) |
| *F21S 41/32* | (2018.01) |
| *F21S 41/663* | (2018.01) |
| *F21S 41/255* | (2018.01) |
| *F21S 41/147* | (2018.01) |
| *F21S 41/16* | (2018.01) |
| *F21S 41/675* | (2018.01) |
| *F21S 41/40* | (2018.01) |
| *F21Y 115/10* | (2016.01) |
| *F21Y 115/30* | (2016.01) |

(52) U.S. Cl.
CPC .............. *F21S 41/16* (2018.01); *F21S 41/18* (2018.01); *F21S 41/255* (2018.01); *F21S 41/285* (2018.01); *F21S 41/32* (2018.01); *F21S 41/321* (2018.01); *F21S 41/40* (2018.01); *F21S 41/663* (2018.01); *F21S 41/675* (2018.01); *B60Q 2300/41* (2013.01); *B60Q 2300/42* (2013.01); *F21Y 2115/10* (2016.08); *F21Y 2115/30* (2016.08)

(58) Field of Classification Search
CPC ...................... B60Q 2300/41–42; F21S 41/10; F21S 41/14; F21S 41/141; F21S 41/147; F21S 41/151; F21S 41/153; F21S 41/155; F21S 41/16; F21S 41/18; F21S 41/255; F21S 41/28; F21S 41/285; F21S 41/32; F21S 41/321; F21S 41/40; F21S 41/60; F21S 41/63; F21S 41/65; F21S 41/657; F21S 41/663; F21S 41/675; F21Y 2115/10–30

See application file for complete search history.

(56) References Cited

U.S. PATENT DOCUMENTS

| | | |
|---|---|---|
| 9,227,555 B2 | 1/2016 | Kalapodas |
| 2013/0027951 A1* | 1/2013 | Takahashi ............. F21S 41/675 362/465 |
| 2013/0258688 A1 | 10/2013 | Kalapodas |
| 2016/0318437 A1 | 11/2016 | Vilakathara |
| 2017/0067609 A1 | 3/2017 | Ichikawa et al. |

FOREIGN PATENT DOCUMENTS

| | | | |
|---|---|---|---|
| CN | 106439689 A | * | 2/2017 |
| DE | 102015218021 A1 | | 4/2016 |
| EP | 2487407 A2 | | 8/2012 |
| EP | 2541130 A2 | | 1/2013 |
| EP | 2716961 A1 | | 4/2014 |
| JP | 2016120770 A | | 7/2016 |
| WO | 2016050971 A1 | | 4/2016 |
| WO | 2016070962 A1 | | 5/2016 |

OTHER PUBLICATIONS

European Patent Office, Extended European Search Report for related European Patent Application No. EP3410004, dated Oct. 19, 2018.

Chinese Patent Office, Office Action (including English translation) in corresponding Chinese Application No. 201810529275.2, dated May 6, 2021.

Japanese Patent Office, Office Action (including English translaton) in corresponding Japanese Application No. 2018-102384, dated Jul. 15, 2022.

* cited by examiner

Z = Segment Height Dimension
X = Segment Width Dimension

HYBRID HEADLAMP SYSTEMS AND METHODS

CROSS-REFERENCE TO RELATED APPLICATIONS

This application is a continuation of U.S. application Ser. No. 16/691,272, filed Nov. 21, 2019, which is a divisional of U.S. application Ser. No. 15/608,357, filed May 30, 2017 (now U.S. Pat. No. 10,502,378), the entire contents of which are incorporated herein by reference.

BACKGROUND

Motor vehicles contain numerous lighting devices for both interior and exterior illumination. For example, exterior vehicle lighting devices may perform stop lamp functions, tail lamp functions, headlamp functions, daytime running light functions, dynamic bending light functions, and fog lamp functions. Numerous studies have found that nighttime visibility is a key to highway safety.

In an effort to improve vehicle and pedestrian safety, most governments promulgate some form of safety regulations that specify motor vehicle lighting performance requirements. This helps to ensure adequate illumination of the roadway and enhance the visibility of motor vehicles on the roads so that their presence is perceived and their signals are understood in daylight, in darkness, and in conditions of reduced visibility.

It is prudent for vehicle manufacturers to design vehicle lighting devices, which meet the technical requirements of various standards around the world and in particular, in their associated marketing regions. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers can provide optional lighting effects (in addition to the required lighting functionality) to enhance a vehicle's illumination performance and styling.

It may be technically challenging to provide aesthetically appealing vehicle lighting devices while also meeting the necessary cost, technology, and regulatory requirements. For example, headlamps on currently manufactured cars and trucks typically use significant power and require various additional components, such as reflectors, lenses, cut-off devices, and the like. Aesthetic lighting effects lead to an even greater number of components and complexity. Such vehicle lighting devices often are not easily adapted to the styling of the vehicle.

In recent years, a number of vehicle manufacturers have begun using lamps having light-emitting diodes (LEDs). LED-source lamps help to meet desired lighting performance, reduce power, and provide improved aesthetic characteristics.

Headlamps having one or more laser diode light sources have also been used. A laser diode light source provides a high luminance source that is beneficial for down the road and in hot spot regions. However, headlamps having laser diode light sources are more costly than head-lamps having LED light sources.

The "background" description provided herein is for the purpose of generally presenting the context of the disclosure. Work of the presently named inventors, to the extent it is described in this background section, as well as aspects of the description, which may not otherwise qualify as conventional art at the time of filing, are neither expressly nor impliedly admitted as conventional art against the present disclosure.

SUMMARY

Embodiments described herein include the following aspects.

(1) A headlamp assembly has a low beam assembly configured to generate a low beam distribution. The low beam assembly includes a first low beam solid state light source module having a first laser solid state light source optically configured to emit a first luminous intensity distribution and a second laser solid state light source optically configured to emit a second luminous intensity distribution, and a second low beam solid state light source module having a solid state light source optically configured to emit a third luminous intensity distribution which at least partially overlaps at least one of the first and second luminous intensity distributions. The headlamp assembly also has a high beam assembly configured to generate a high beam distribution.

(2) The headlamp assembly of (1), wherein the first luminous intensity distribution differs from the second luminous intensity distribution.

(3) The headlamp assembly of either (1) or (2), wherein the first luminous intensity distribution includes a maximum intensity hot spot region.

(4) The headlamp assembly of any one of (1) through (3), wherein the second luminous intensity distribution includes a concentrated intensity hot spot region and a larger spread distribution compared to the first luminous intensity distribution.

(5) The headlamp assembly of any one of (1) through (4), wherein the second low beam solid state light source module includes a plurality of light-emitting diode (LED) components.

(6) The headlamp assembly of any one of (1) through (5), wherein the second low beam solid state light source module includes a plurality of solid state light source modules.

(7) The headlamp assembly of any one of (1) through (6), wherein the first luminous intensity distribution is equal to the second luminous intensity distribution.

(8) The headlamp assembly of any one of (1) through (7), wherein each of the first low beam solid state light source module and the second low beam solid state light source module includes at least one of a semiconductor light-emitting diode (LED), an organic light-emitting diode (OLED), a polymer light-emitting diode (PLED), and a monolithic light-emitting diode (MLED).

(9) A headlamp assembly has a first solid state light source module and a second solid state light source module. The first solid state light source module includes a first laser solid state light source optically configured to emit a first luminous intensity distribution and a second laser solid state light source optically configured to emit a second luminous intensity distribution. The second solid state light source module is optically configured to emit a third luminous intensity distribution which at least partially overlaps at least one of the first and second luminous intensity distributions. The headlamp assembly is configured to generate a low beam distribution.

(10) The headlamp assembly of (9), wherein the first luminous intensity distribution differs from the second luminous intensity distribution.

(11) The headlamp assembly of either (9) or (10), wherein the first luminous intensity distribution includes at least one maximum intensity hot spot region.

(12) The headlamp assembly of any one of (9) through (11), wherein the second luminous intensity distribution includes a concentrated intensity hot spot region and a larger spread distribution compared to the first luminous intensity distribution.

(13) The headlamp assembly of any one of (9) through (12), wherein the second solid state light source module includes a plurality of LED components.

(14) The headlamp assembly of any one of (9) through (13), wherein the second solid state light source module includes a plurality of solid state light source modules.

(15) The headlamp assembly of any one of (9) through (14), wherein the first luminous intensity distribution is equal to the second luminous intensity distribution.

(16) The headlamp assembly of any one of (9) through (15), further including a high beam assembly con-figured to generate a high beam distribution.

(17) The headlamp assembly of any one of (9) through (16), wherein each of the first solid state light source module and the second solid state light source module includes at least one of a semiconductor light-emitting diode (LED), an organic light-emitting diode (OLED), a polymer light-emitting diode (PLED), and a monolithic light-emitting diode (MLED).

(18) A method of generating hybrid luminous intensity distribution includes emitting a first luminous intensity distribution via a first laser solid state light source of a first solid state light source module; emitting a second luminous intensity distribution via a second laser solid state light source of the first solid state light source module, wherein the first luminous intensity distribution differs from the second luminous intensity distribution; and emitting a third luminous intensity distribution via a second solid state light source module, wherein the third luminous intensity distribution at least partially overlaps at least one of the first and second luminous intensity distributions.

(19) The method of generating a hybrid luminous intensity distribution of (18), wherein the first luminous intensity distribution includes a maximum intensity hot spot region.

(20) The method of generating a hybrid luminous intensity distribution of either one of (18) or (19), wherein the second luminous intensity distribution includes a concentrated intensity hot spot region and a larger spread distribution compared to the first luminous intensity distribution.

(21) A product made by any one of (18) through (20).

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation specific decisions will be made in order to achieve the developer's specific goals, such as compliance with application- and business-related constraints, and that these specific goals will vary from one implementation to another and from one developer to another.

Embodiments described herein provide systems of and methods for a hybrid headlamp. In particular, a hybrid headlamp includes both solid state light source(s) and laser solid state light source(s). As used herein, a solid state light source refers to a type of light source using an electroluminescence phenomenon in which a material emits light in response to passage of an electric current or in response to a strong electric field. Examples of light sources include, but are not limited to semiconductor light-emitting diodes (LEDs), organic light-emitting diodes (OLEDs), polymer light-emitting diodes (PLEDs), and monolithic light-emitting diodes (MLEDs). A high beam assembly generates a beam distribution that is complementary to a low beam distribution to obtain a high beam distribution.

In one example, the solid state light source(s) provides a wide spread function at a minimal cost, while the laser solid state light source(s) provides high luminance for down the road. Beam patterns of the solid state light source and the laser solid state light source are selected to harmonize differences in the beam pattern of these different sources. Additional laser solid state light sources and/or solid state light sources may be used to blend or transition between the different light source beam patterns.

Figure 1:
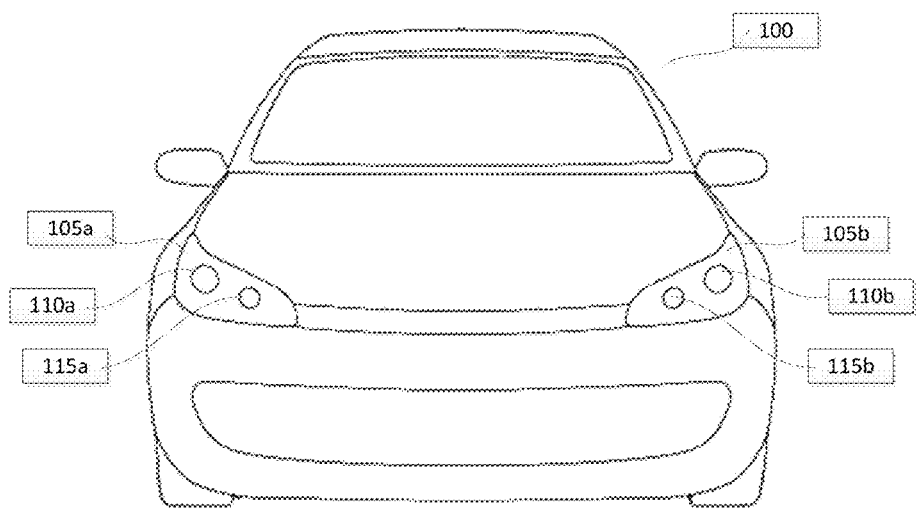
FIG. 1 illustrates a front-end of an exemplary motor vehicle according to one embodiment.

FIG. 1. illustrates a front-end of an exemplary motor vehicle 100. Motor vehicle 100 includes two head-lamp assemblies 105a and 105b. Headlamp assemblies 105a and 105b include low beam headlamps 110a and 110b (also referred to as a lower or dipped beam) and high beam headlamps 115a and 115b (also referred to as a main or driving beam). Typically, the low beam headlamps 110a and 110b are used whenever another vehicle is on the road directly ahead of motor vehicle 100 and/or whenever another vehicle is approaching motor vehicle 100 from an opposite direction.

Figure 2:
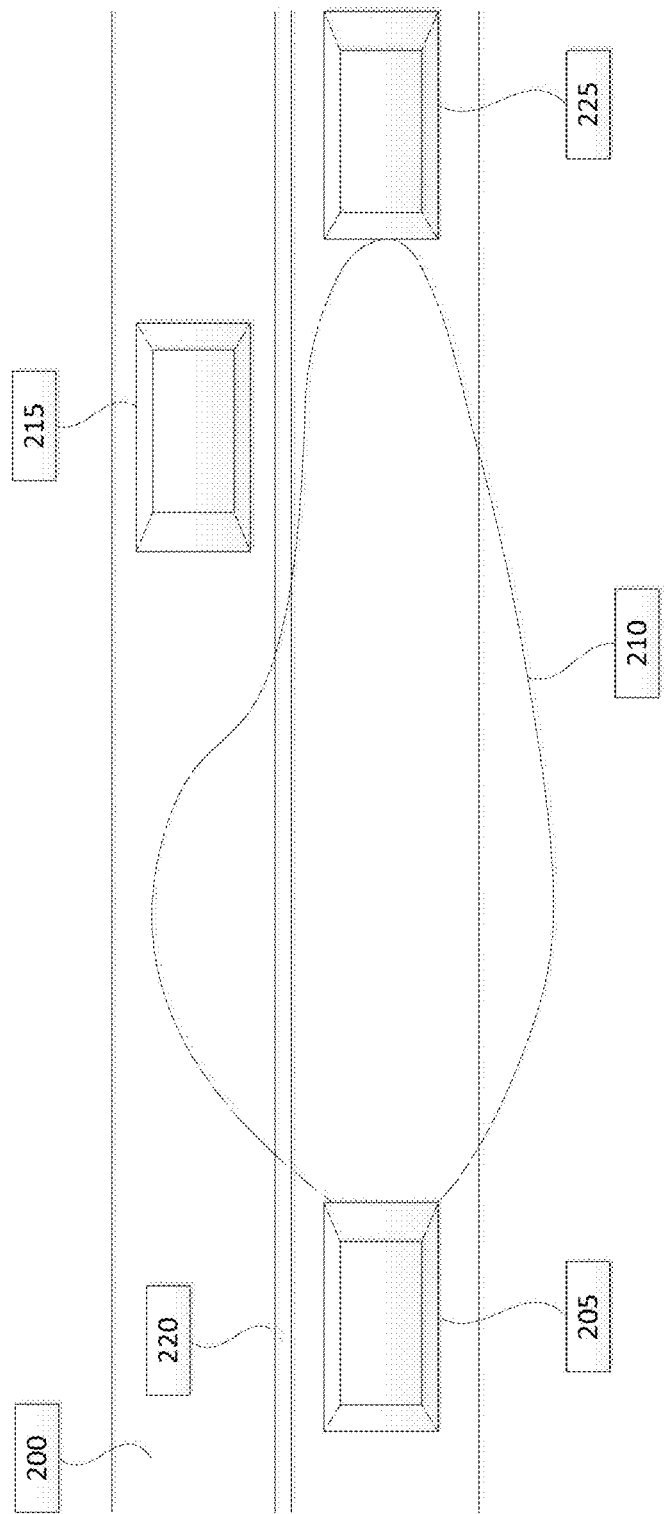
FIG. 2 is a schematic diagram of an exemplary roadway, a motor vehicle, and a light distribution pattern according to one embodiment.

FIG. 2 is a schematic diagram of an exemplary roadway 200, motor vehicle 205, and a light distribution pattern 210 for low beam headlamps of motor vehicle 205. Light distribution pattern 210 for the low beam headlamps of motor vehicle 205 can be optically designed to minimize the amount of light that crosses the centerline 220 of roadway 200 to reduce dazzle (a blinding effect from the headlights) to a driver of an oncoming motor vehicle 215. Additionally, a range of the low beam headlamps of motor vehicle 205 can be limited to reduce dazzle in the rear-view mirror for a driver of motor vehicle 225 directly ahead of motor vehicle 205 driving in the same direction.

Figure 3:
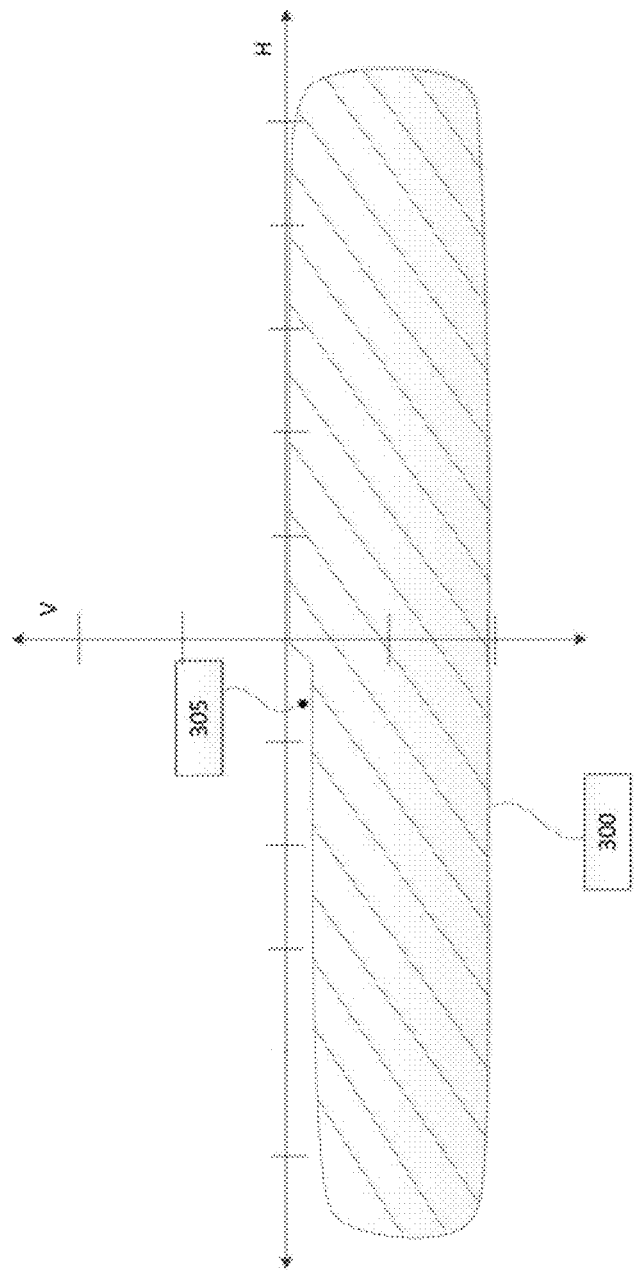
FIG. 3 illustrates an exemplary luminous intensity distribution according to one embodiment.

FIG. 3 illustrates an exemplary luminous intensity distribution 300 of a low beam headlamp as seen or measured at a screen spaced from, and parallel to, the front (emitting) face of the headlamp. A horizontal axis H and vertical axis V are shown overlaid on luminous intensity distribution 300 in FIG. 3. The horizontal axis H and vertical axis V identify horizontal and vertical planes intersecting both the center of the headlamp and the screen. The horizontal axis H and vertical axis V shown in FIG. 3 include tick marks spaced at 5° intervals.

Most states, countries, or regions, which utilize motor vehicles, have various requirements and standards that a vehicle must adhere to in order to legally use roadways. For example, Federal Motor Vehicle Safety Standard (FM-VSS) No. 108 specifies various maximum and minimum photometric intensity values (based on angle) for headlamps on vehicles operated within the Unites States. In addition to these requirements, the Insurance Institute for Highway Safety (IIHS) in the United States has its own set of tests and ratings (Headlight Test and Rating Protocol) for head-lamp performance. The IIHS tests and ratings seek to encourage manufacturers to improve the illumination performance in actual on-road use. IIHS evaluations have shown that the on-road illumination provided by vehicle headlamps varies widely. In addition, IIHS has rated the majority of headlamps in a poor category (e.g. insufficient illumination, excessive glare, etc.).

Point 305 in FIG. 3 is a key measurement location, defined by the FMVSS No. 108 standard, for ensuring that a low beam headlamp does not dazzle the driver of an oncoming motor vehicle. Point 305 is located 3.5° to the left of the vertical axis V and 0.86° below the horizontal axis H. To meet the requirements of FMVSS No. 108, a headlamp low beam must have a luminous (photometric) intensity below a specified threshold (12,000 cd, for example) at point 305. FMVSS No. 108 also specifies a minimum luminous intensity at other points on the luminous intensity distribution 300.

Figure 4:
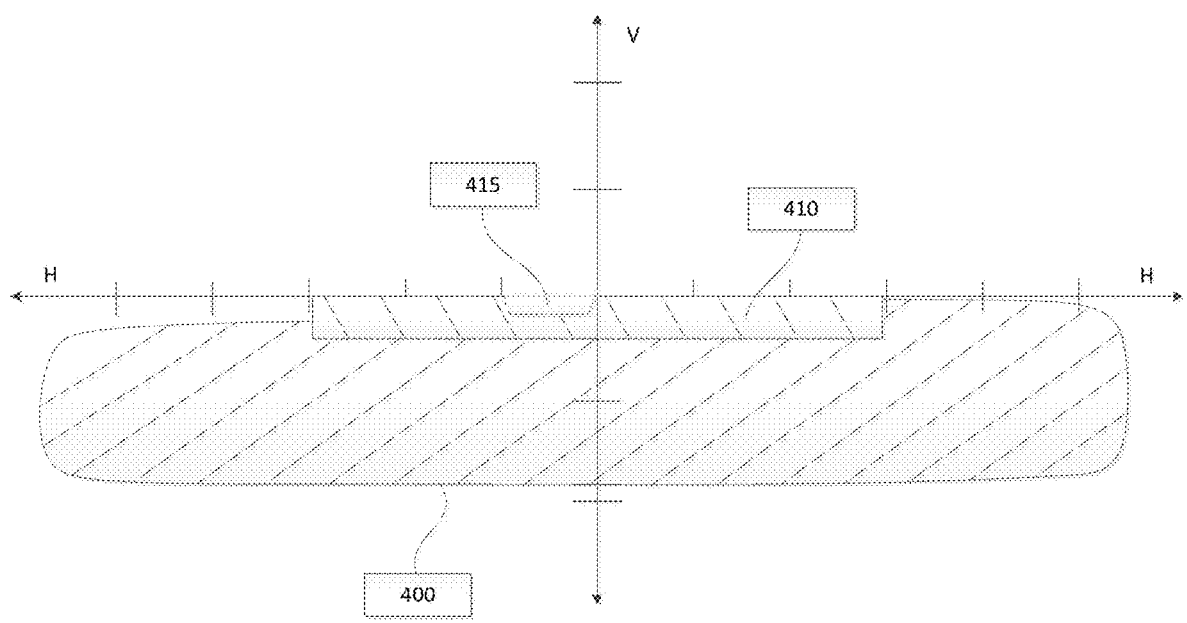
FIG. 4 illustrates an exemplary luminous intensity distribution according to one embodiment.

FIG. 4 illustrates an exemplary luminous intensity distribution 400 of a low beam headlamp similar to that shown in FIG. 3. Rectangular area 410, with notch 415, is a target zone that can be additionally illuminated to achieve higher ratings in the testing performed based on the IIHS Headlight Test and Rating Protocol. In some embodiments, the notch 415 reduces the light emission around the point 305 (FIG. 3) that is located 3.5° to the left of the vertical axis V and 0.86° below the horizontal axis H. The notch 415 can allow headlamp assembly 105a and 105b to yield improved IIHS ratings, while still meeting the requirements of FMVSS No. 108. In some embodiments, notch 415 can be located substantially to the left of vertical axis V. In other embodiments, notch 415 can be positioned symmetrically around the vertical axis V. Placement of the notch is generally dependent on the particular safety requirements and user preferences that do not conflict with the safety requirements.

Figure 5A:
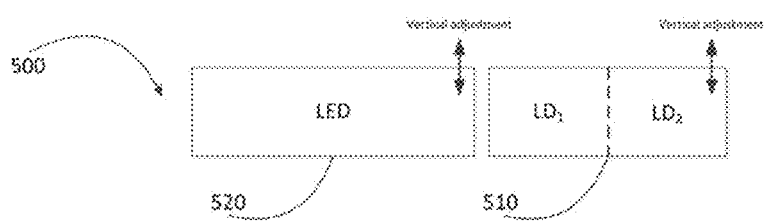
FIG. 5A illustrates an exemplary hybrid headlamp according to one embodiment.

FIG. 5A illustrates an exemplary hybrid headlamp 500 according to embodiments described herein. FIG. 5A illustrates a laser solid state light source module 510 and a solid state light source module 520. In the laser solid state light source module 510, LD1 represents a first laser diode light source and LD2 represents a second laser diode light source.

Figure 5B:
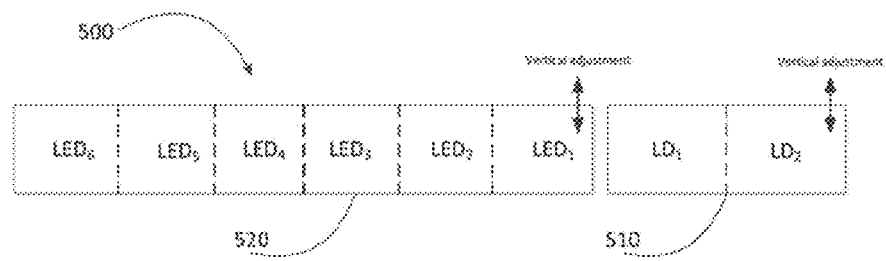
FIG. 5B illustrates a laser solid state light source module and an solid state light source module according to one embodiment.
Figure 5C:
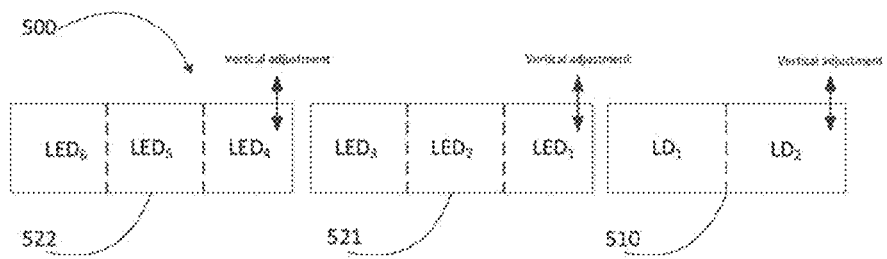
FIG. 5C illustrates a laser solid state light source module and two solid state light source modules according to one embodiment.

Present inventors recognized that separation of the laser solid state light source module 510 from the solid state light source module 520 is desirable because the thermal, electronic, and safety considerations of the two modules are different. Further, separation of the laser solid state light source module 510 from the solid state light source module 520 facilitates separate aiming and alignment of the two modules with associated tolerances. FIG. 5A, as well as FIGS. 5B and 5C, illustrates the independent vertical adjustment of the laser solid state light source module 510 from the solid state light source module 520. In addition, the laser solid state light source module 510 typically needs laser safety sensors and has additional thermal requirements.

FIG. 5B illustrates a laser solid state light source module 510 and a solid state light source module 520 having multiple solid state light source components. FIG. 5B illustrates six LED components, $LED_1$ through $LED_6$. However, less than six LED components or more than six LED components are contemplated by embodiments described herein.

FIG. 5C illustrates laser solid state light source module 510 and a first solid state light source module 521 having three LED components LED1 through LED3 , and a second solid state light source module 522 having three LED components LED4 through LED6 . However, more than two solid state light source modules are contemplated by embodiments described herein. In addition, less than three or more than three LED components within each solid state light source module are contemplated by embodiments described herein.

Figure 6A:
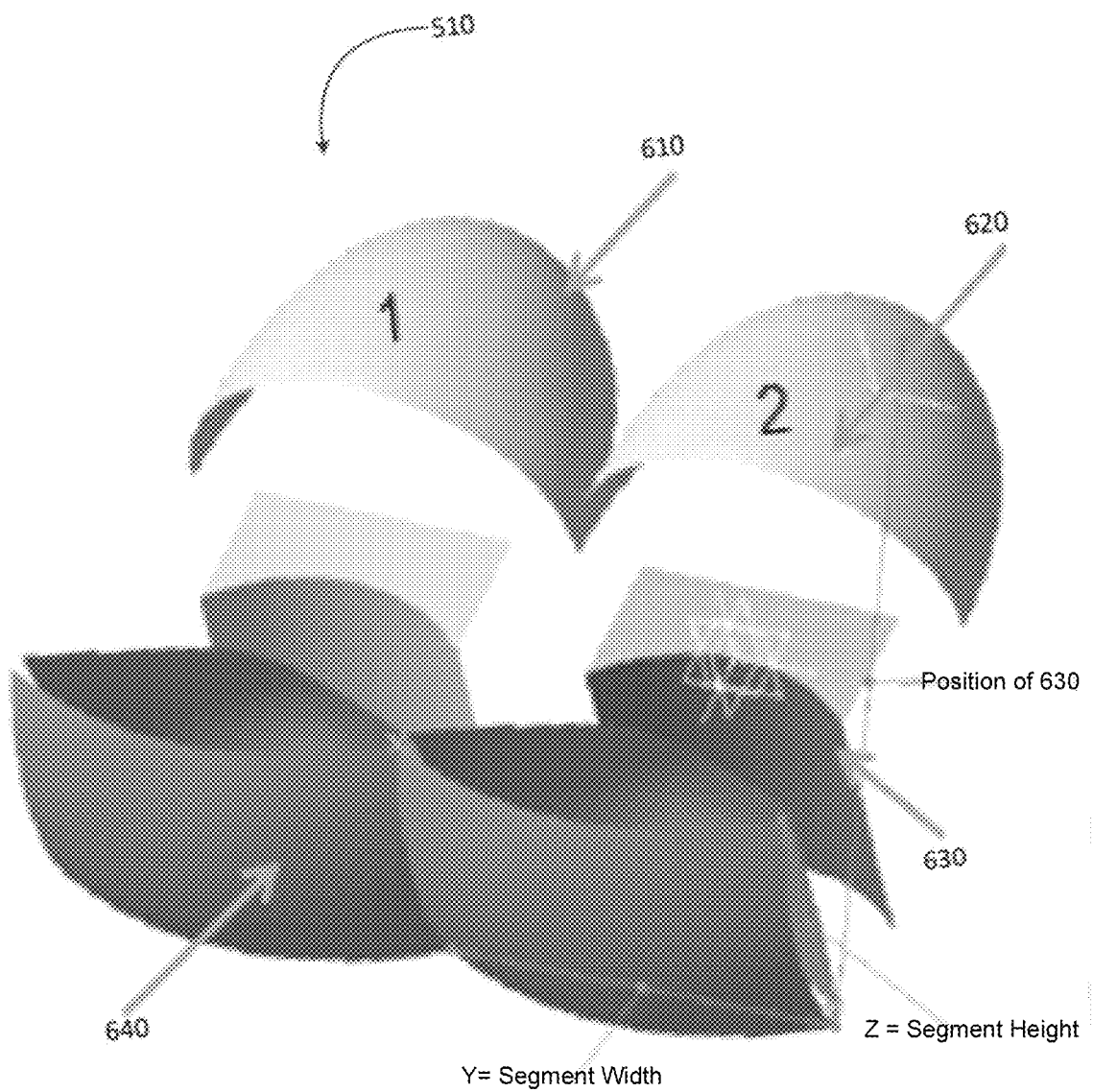
FIG. 6A illustrates components of a laser solid state light source module with two laser solid state light sources according to one embodiment.
Figure 6B:
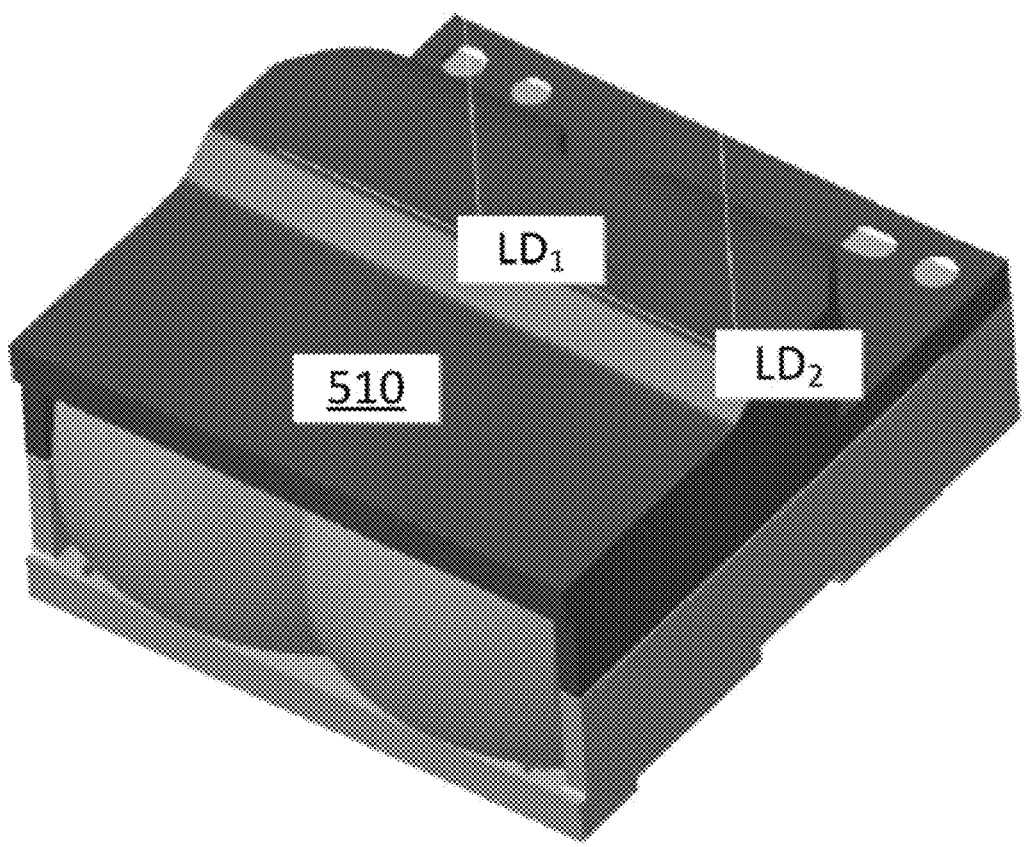
FIG. 6B illustrates two laser solid state light sources encased as a module according to one embodiment.

FIG. 6A illustrates components of laser solid state light source module 510 with two laser diode sources, LD1 and LD2. Each of the laser diode sources has an elliptical reflector 610 and 620, respectively with a folder 630 and an imaging lens 640 in which the light source rays are refracted and re-transmitted out through the imaging lens 640. An exemplary elliptical reflector 610 and 620 made of thermoplastic or metallic material has a reflectivity (R) of approximately 0.80. The reflector transition surface is designed to absorb light. An exemplary reflector transition surface has a focal length range of 3-6 mm. An exemplary folder 630 has a material with a reflectivity of approximately 0.85. An exemplary imaging lens 640 is made of polymethyl methacrylate (PMMA), polycarbonate (PC), silicone, glass, or thermoplastic material for example. FIG. 6B illustrates the two laser diode sources encased as a solid state light source module 510.

Figure 7A:
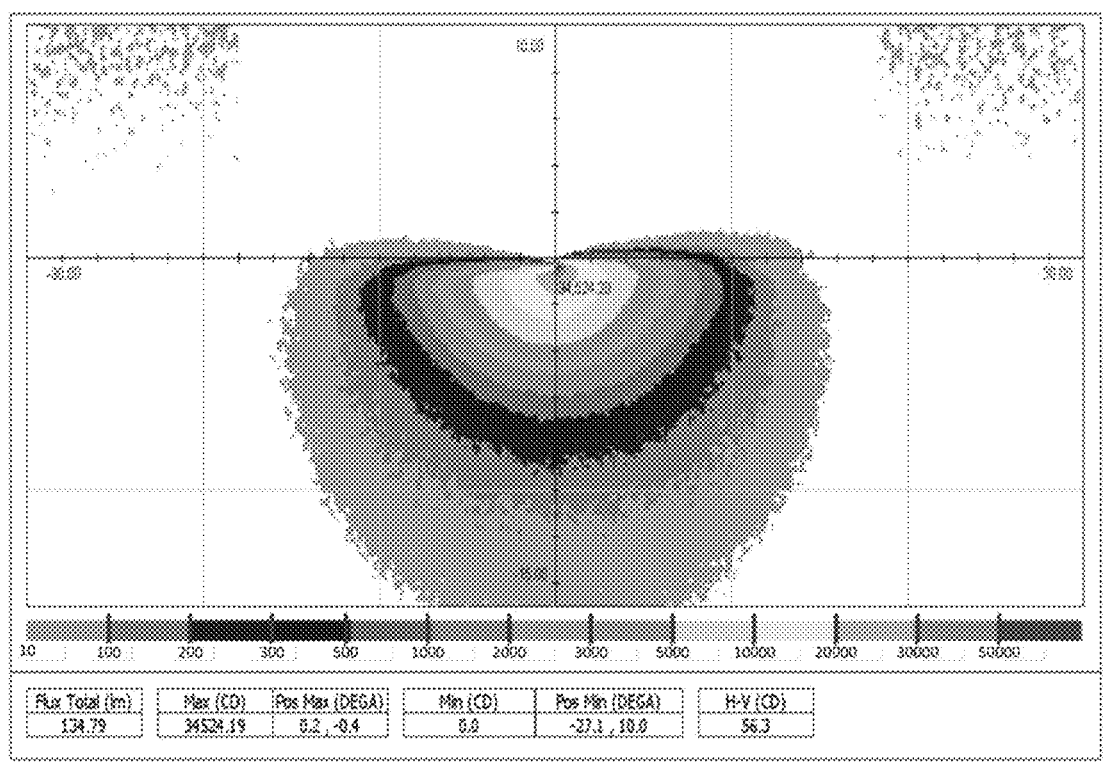
FIG. 7A illustrates an exemplary luminous intensity distribution for a laser solid state light source according to one embodiment.

FIG. 7A illustrates an exemplary luminous intensity distribution for a first laser diode source LD1. LD1 provides a hot spot region to provide adequate light at a distance down the road. A hot spot region can be defined as a region having maximum intensity (candela). The hot spot region has a small aperture height (with respect to the vertical location of the maximum intensity), wherein the hot spot region is concentrated and/or has an increased maxi-mum intensity near the horizon. A higher maximum intensity can be achieved, but when it is located at approximately 2.0 degrees vertically, there may not be as much projection down the road or near the horizon. A high maximum intensity near its cut-off point is optimum for down the road projection. In FIG. 7A, the maximum intensity is located at a position of 0.2 degrees along the horizontal axis and −0.4 degrees along the vertical axis. The maximum intensity illustrated is 34,524.20 candela having a total lumen flux of 134.79.

Figure 7B:
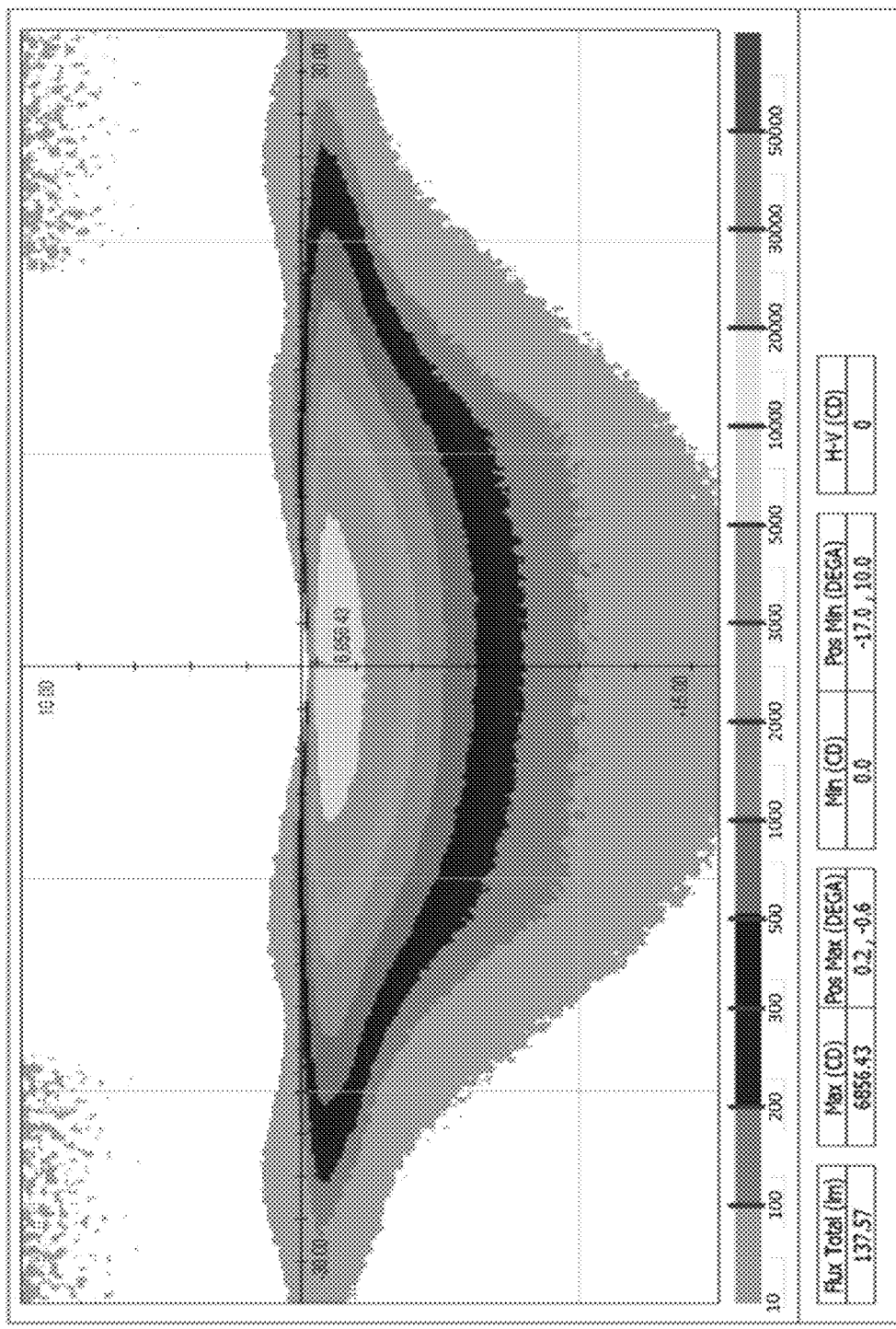
FIG. 7B illustrates an exemplary luminous intensity distribution for a laser solid state light source according to one embodiment.

FIG. 7B illustrates an exemplary luminous intensity distribution for a second laser diode source LD2. The luminous intensity distribution of LD2 has more spread than LD1 to blend with a flat solid state light source module. In FIG. 7B, the maximum intensity is located at a position of 0.2 degrees along the horizontal axis and −0.6 degrees along the vertical axis. The maximum intensity illustrated is 6856.43 candela having a total lumen flux of 137.57.

Any number of LDs having different intensity distributions may be used to provide a desired blending transition from the hot spot of LD1 to the intensity distribution of a particular solid state light source module. In an alternative embodiment, the second laser diode source LD2 can be replaced with a high luminance solid state light source component due to the distribution pattern and concentrated hot spot area. This would provide a lower cost and better adaptation of color to the solid state light source module than would a laser solid state light source module, but intensity transitions may become more noticeable.

Combinations of laser solid state light sources and solid state light sources may be used to achieve a desired effect. However, certain disadvantages may be realized, such as a reduced source luminance. This could lower the maxi-mum intensity and reduce a performance under IIHS ratings. The optical system may also need to be larger to obtain the same performance.

Figure 7C:
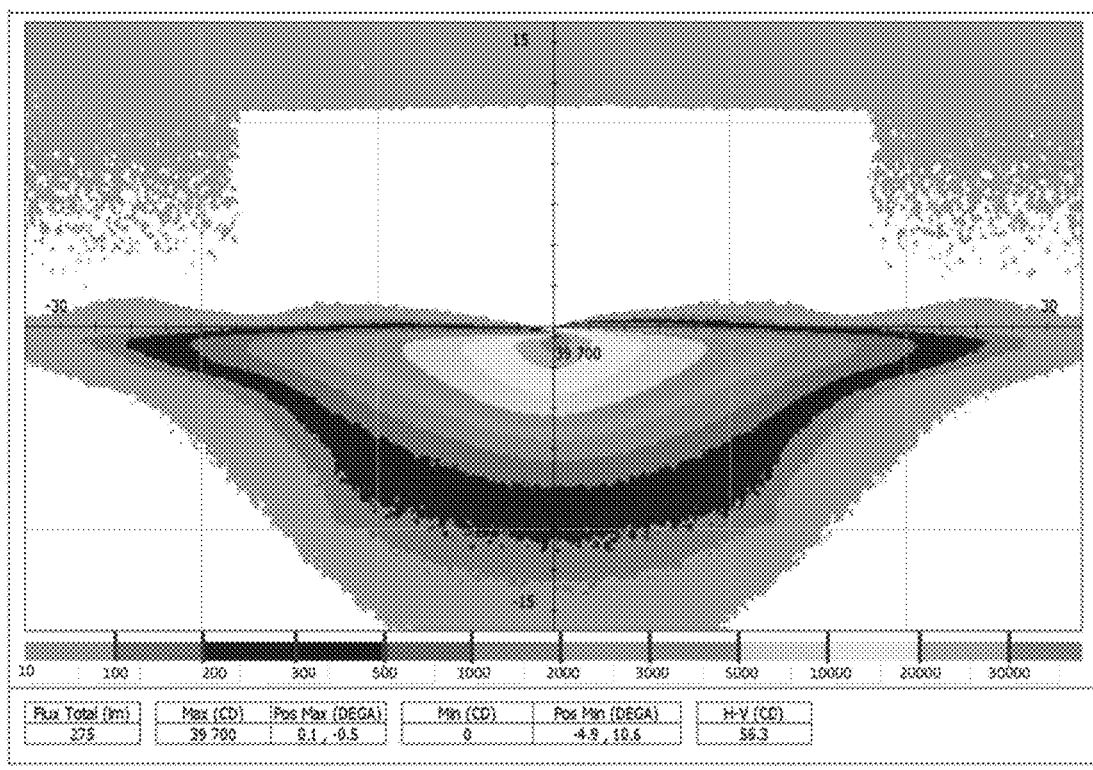
FIG. 7C illustrates an exemplary combined luminous intensity distribution for two laser solid state light sources according to one embodiment.

FIG. 7C illustrates an exemplary combined luminous intensity distribution for the first laser diode source LD1 and the second laser diode source LD2. In FIG. 7C, the maximum intensity is located at a position of 0.1 degrees along the horizontal axis and −0.5 degrees along the vertical axis. The maximum intensity illustrated is 39,700 candela having a total lumen flux of 275. The combined laser diode sources provide improved tolerances and are sufficient to meet most headlamp standards and test points. In an embodiment, the optical configuration of LD1 and LD2, are the same.

Figure 8:
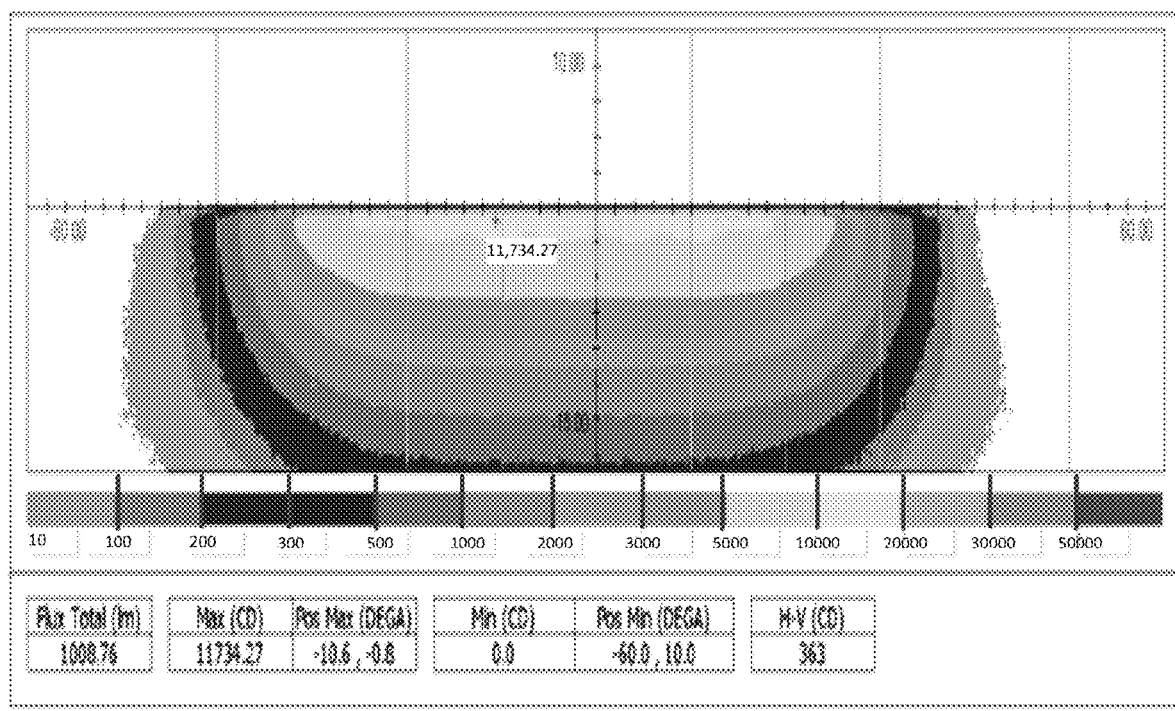
FIG. 8 illustrates an exemplary luminous intensity distribution for a flat beam pattern of a solid state light source component according to one embodiment.

FIG. 8 illustrates an exemplary luminous intensity distribution for a flat beam pattern of a solid state light source component. In FIG. 8, the maximum intensity is located at a position of −10.6 degrees along the horizontal axis and −0.8 degrees along the vertical axis. The maximum intensity illustrated is 11,734.27 candela having a total lumen flux of 1008.76.

Figure 9:
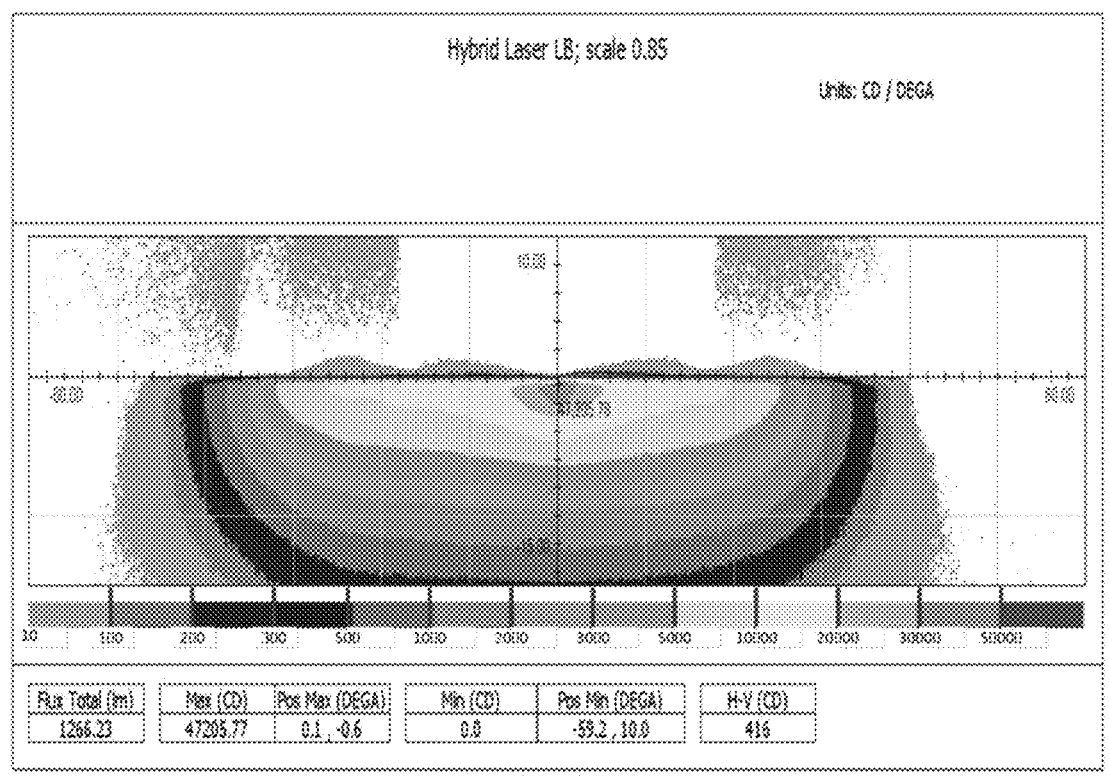
FIG. 9 illustrates an exemplary combined luminous intensity distribution for a hybrid solid state light source module and laser solid state light source module according to one embodiment.

FIG. 9 illustrates an exemplary combined luminous intensity distribution for a hybrid solid state light source module and laser solid state light source module, wherein the laser solid state light source module includes the first laser diode source LD1 and the second laser diode source LD2. In FIG. 9, the maximum intensity is located at a position of 0.1 degrees along the horizontal axis and −0.6 degrees along the vertical axis. The maximum intensity illustrated is 47,205.77 candela having a total lumen flux of 1266.23. The combination of a flat solid state light source module with the laser solid state light source module produces a high performance uniform light beam. The hybrid low beam headlamp provides a thin aspect headlamp assembly for optimal down the road lamp performance and at a cost lower than a completely laser solid state light source assembly.

Figure 10:
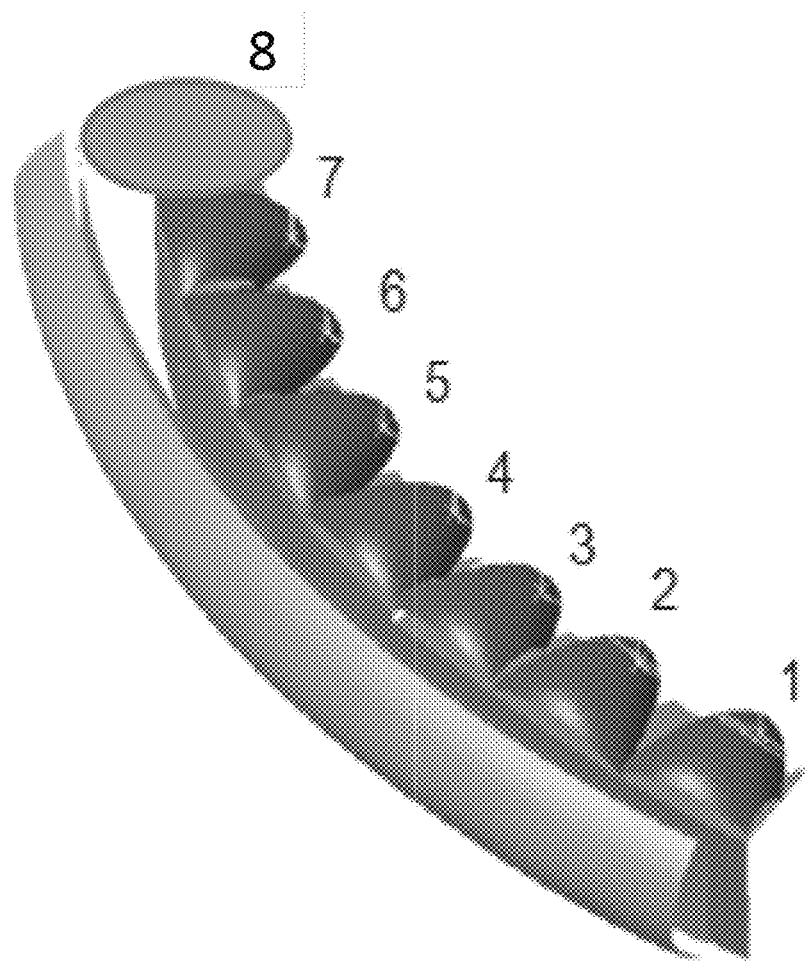
FIG. 10 illustrates a layout of an exemplary hybrid low beam array assembly according to one embodiment.
Figure 10:
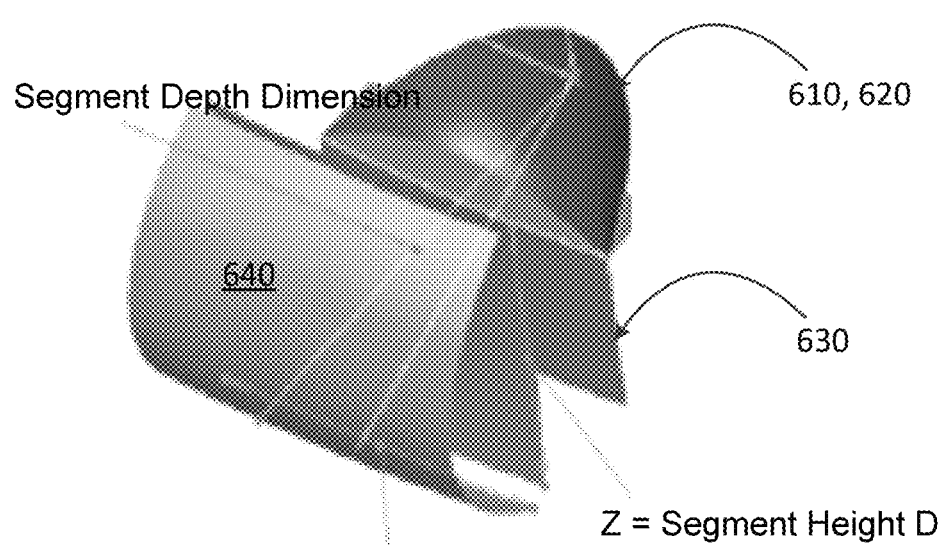

FIG. 10 illustrates an expanded view of an exemplary hybrid low beam array assembly. FIG. 10 illustrates seven solid state light source modules, numbered one through seven. However, more than seven or fewer than seven solid state light source modules are contemplated by embodiments described herein. Module eight represents the laser solid state light source module. FIG. 10 also illustrates a single continuous lens and folder. However, separate reflector segments are also contemplated by embodiments described herein.

In an embodiment given for illustrative purposes only, the dimensions for each segment (individual module plus an associated portion of the reflector 610 and 620, folder 630, and imaging lens 640) is approximately 15 mm in height, 18 mm in width, and 25 mm in depth. When each solid state light source module produces approximately 300 lumens, the array of lumens produces 7×300=approximately 2100 lumens. The elliptical reflector 610 and 620 can be made of thermoplastic or metallic material and can have a focal length range of 1.5-4 mm and a reflectivity (R) range of 0.90-0.95. The folder 630 material has a reflectivity of approximately 0.8-0.95. The imaging lens 640 can be made of PMMA, PC, silicone, glass, or thermoplastic material. However, other materials and dimensions of segments are contemplated by embodiments described herein.

Figure 11:
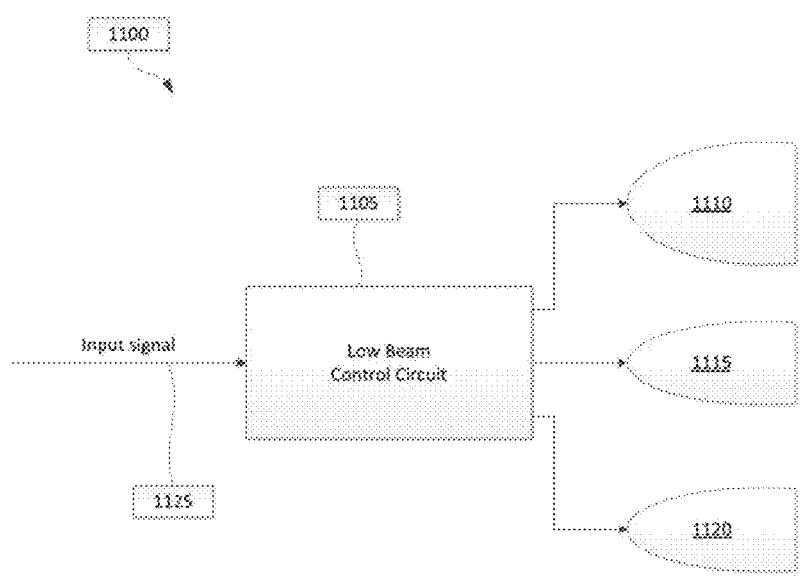
FIG. 11 illustrates a functional block diagram of an exemplary low beam headlamp assembly according to one embodiment.

FIG. 11 illustrates a functional block diagram of a low beam headlamp assembly 1100. Low beam headlamp assembly 1100 includes a low beam control circuit 1105, a laser solid state light source module 1110, and a solid state light source module 1115. One or more optional modules 1120 include additional solid state light source modules, aside from solid state light source module 1115. An input signal 1125 is connected to the low beam control circuit 1105. The input signal 1125 can be a switch to initiate or close power to one or more of the laser solid state light source module 1110, the solid state light source module 1115, and the optional solid state light source module(s) 1120. Other types of input signals 1125 are contemplated by embodiments described herein, such as a light/dark input signal.

It should be noted that while FIG. 11 illustrates low beam control circuit 1105 as included within low beam headlamp assembly 1100, low beam control circuit 705 could also be located apart from low beam headlamp assembly 1100. Moreover, a single low beam control circuit 1105 can be employed for both a right and left low beam head-lamp assembly such that the laser solid state light source module 1110, the solid state light source module 1115, and the optional solid state light source module(s) 1120 are driven in a synchronized manner.

Figure 12:
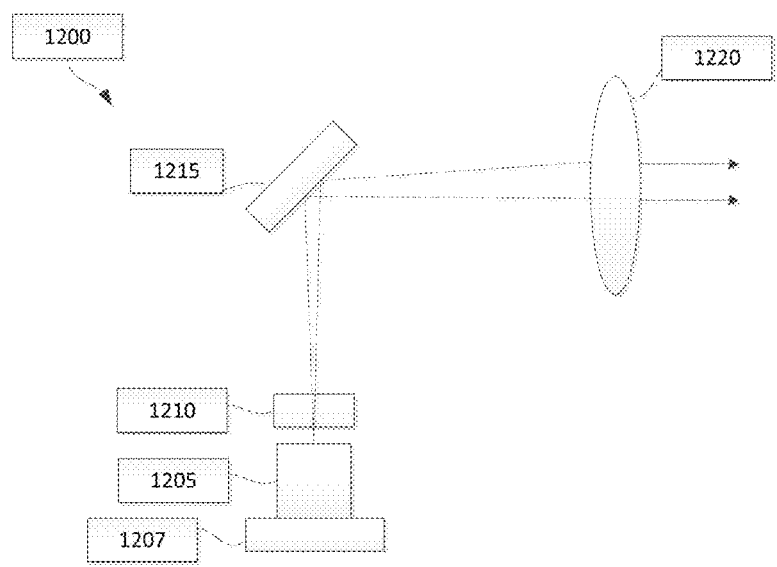
FIG. 12 illustrates a functional block diagram of an exemplary laser solid state light source module according to one embodiment.

FIG. 12 illustrates a functional block diagram of an exemplary laser solid state light source module 1200, which includes a laser emitter 1205, a phosphor plate 1210, a minor 1215, and a lens 1220. Laser emitter 1205 may, in some implementations, include a laser solid state light source with emission in the blue visible spectrum (for example, with a wavelength in the range of 360 and 480 nm). Laser emitter 1205 can, in some embodiments, be mounted on a heatsink 1207.

The light from laser emitter 1205 is directed through phosphor plate 1210. Phosphor plate 1210 can include phosphors such as, but not limited to, YAG, LuAG, nitride, oxynitride, and the like. Phosphor plate 1210 converts the light from laser emitter 1205 to a white light. In place of phosphor plate 1210, laser emitter 1205 can be coated with a phosphor layer of similar materials.

The light from laser emitter 1205 is reflected by mirror 1215. Minor 1215 can, in some embodiments, include actuators and/or vibrators configured to broaden or tailor the shape of the light beam from laser emitter 1205. The light reflected from mirror 1215 passes through lens 1220. Other components can be employed in laser solid state light source module 1200 to detect failure of phosphor plate 1210 or mirror 1215 to ensure the safety of laser solid state light source module 1200.

Figure 13:
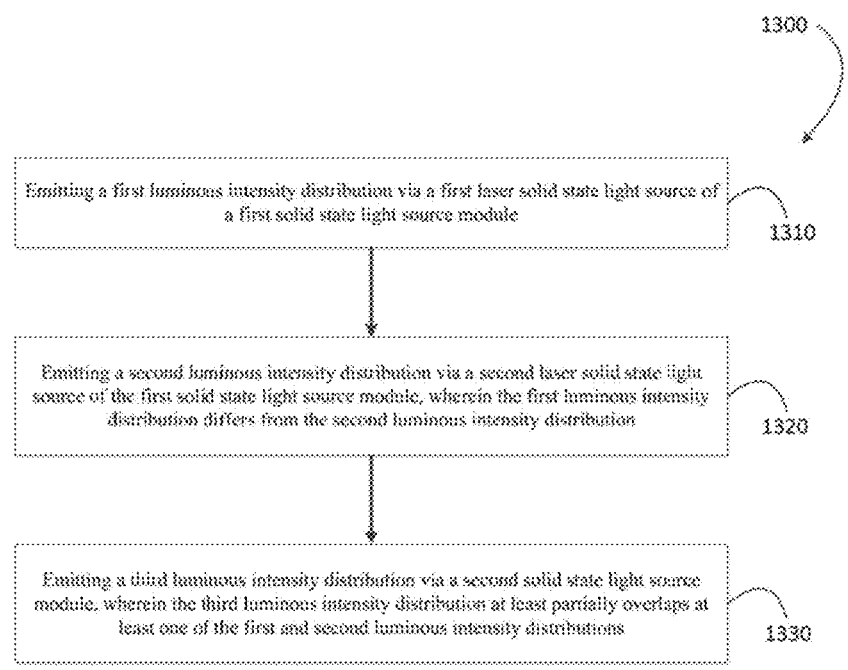
FIG. 13 is a flowchart for a method of generating a hybrid luminous intensity distribution according to one embodiment.

FIG. 13 is a flowchart for an exemplary method 1300 of generating a hybrid luminous intensity distribution. In step 1310, a first luminous intensity distribution is emitted, via a first laser solid state light source of a first solid state light source module. In one embodiment, the first luminous intensity distribution includes a maximum intensity hot spot region.

In step 1320, a second luminous intensity distribution is emitted via a second laser solid state light source of the first solid state light source module. The first luminous intensity distribution differs from the second luminous intensity distribution. In one embodiment, the second luminous intensity distribution includes a concentrated intensity hot spot region and a larger spread distribution compared to the first luminous intensity distribution.

In step 1330, a third luminous intensity distribution is emitted, via a second solid state light source module. The third luminous intensity distribution at least partially overlaps at least one of the first and second luminous intensity distributions.

Embodiments described herein provide many advantages. Embodiments described herein for the hybrid low beam assembly provide a high luminance and small aperture height lamp assembly. The superior qualities of a laser solid state light source module are combined with lower cost solid state light source modules.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. More-over, in interpreting the disclosure, all terms should be interpreted in the broadest possible manner consistent with the context. The accompanying claims and their equivalents are intended to cover such forms or modifications, as would fall within the scope and spirit of the disclosure.

What is claimed is:

1. A headlamp assembly, comprising:
   a first low-beam light module having
      a first laser light source that is configured to emit a first luminous intensity distribution and
      a second laser light source that is configured to emit a second luminous intensity distribution; and
   a second low-beam light module that is configured to emit a third luminous intensity distribution that overlaps with at least the first or the second luminous intensity distributions, wherein each luminous intensity distribution is configured to represent a unit mapping of an intensity of light units per unit area across various points of each respective beam pattern of each light module;
   wherein each of the first low-beam light module and the second low-beam light module includes at least one of a semiconductor light-emitting diode (LED), an organic light-emitting diode (OLED), a polymer light-emitting diode (PLED), and a monolithic light-emitting diode (MLED);
   wherein each of the first low-beam light module and the second low-beam light module is configured to generate a low beam distribution;
   wherein each of the first low-beam light module and the second low-beam light module includes a folder element and an imaging lens in which light from a number of sources is refracted and re-transmitted out through the imaging lens; and
   a high beam assembly configured to generate a high beam light distribution.

2. The headlamp assembly of claim 1, wherein the first luminous intensity distribution is equal in total area to the second luminous intensity distribution.

3. The headlamp assembly of claim 1, wherein the first luminous intensity distribution differs from the second luminous intensity distribution.

4. The headlamp assembly of claim 1, wherein the first luminous intensity distribution includes at least one maximum intensity hot spot region.

5. The headlamp assembly of claim 1, wherein the second luminous intensity distribution includes a larger spread distribution compared to a spread distribution of the first luminous intensity distribution.

6. The headlamp assembly of claim 1, wherein the second luminous intensity distribution includes at least one concentrated intensity hot spot area that is smaller in area than the at least one maximum intensity hot spot region of the first luminous intensity distribution.

7. The headlamp assembly of claim 1, where the folder element comprises a material with a light reflectivity (R) of about 0.8-0.95.

8. The headlamp assembly of claim 1, where each low-beam light module has an elliptical reflector formed from a continuous or separate segments with a light reflectivity (R) of about 0.80.

9. A method of generating a hybrid luminous intensity distribution, the method comprising:
   emitting a first light beam via a first laser light source of a first low-beam light module to create a first luminous intensity distribution that includes at least one maximum intensity hot spot region;

emitting a second light beam via a second laser light source of the first low-beam light module to create a second luminous intensity distribution,
where the second luminous intensity distribution includes at least one concentrated intensity hot spot area that is smaller in area than the at least one maximum intensity hot spot region of the first luminous intensity distribution;
wherein each of the first low-beam light module and a second low-beam light module includes a folder element and an imaging lens in which light from a number of sources is refracted and re-transmitted out through the imaging lens;
emitting a third luminous intensity distribution via the second low-beam light module, wherein the third luminous intensity distribution overlaps with at least the first or the second luminous intensity distributions; and
wherein each of the first low-beam light module and the second low-beam light module includes at least one of a semiconductor light-emitting diode (LED), an organic light-emitting diode (OLED), a polymer light-emitting diode (PLED), and a monolithic light-emitting diode (MLED).

10. The method of claim 9, wherein the second luminous intensity distribution includes a larger spread distribution as compared to a spread distribution of the first luminous intensity distribution.

11. The method of claim 9, wherein the first luminous intensity distribution includes a maximum intensity hot spot region.

12. An automotive lighting assembly, comprising:
a high-beam light module configured to generate a high-beam luminous intensity distribution;
a first low-beam light module including
 a first laser light source that is configured to emit a first luminous intensity distribution and
 a second laser light source that is configured to emit a second luminous intensity distribution; wherein the first luminous intensity distribution is equal to the second luminous intensity distribution; and
a second low-beam light module that is configured to emit a third luminous intensity distribution that overlaps with at least the first or the second luminous intensity distributions, wherein each luminous intensity distribution is configured to represent a unit mapping of an intensity of light units per unit area across various points of each respective beam pattern of each light module;
wherein each of the first low-beam light module and the second low-beam light module is configured to generate a low beam distribution; and
wherein each of the first low-beam light module and the second low-beam light module includes a folder element and an imaging lens in which light from a number of sources is refracted and re-transmitted out through the imaging lens; and
where the folder element comprises a material with a light reflectivity (R) of about 0.8-0.95.

* * * * *